(12) United States Patent
Feng et al.

(10) Patent No.: US 7,762,447 B2
(45) Date of Patent: Jul. 27, 2010

(54) MULTIPLE PASS AND MULTIPLE LAYER FRICTION STIR WELDING AND MATERIAL ENHANCEMENT PROCESSES

(75) Inventors: Zhili Feng, Knoxville, TN (US); Stan A. David, Knoxville, TN (US); David Alan Frederick, Harriman, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 12/051,972

(22) Filed: Mar. 20, 2008

(65) Prior Publication Data

US 2009/0236403 A1 Sep. 24, 2009

(51) Int. Cl.
B23K 20/12 (2006.01)
(52) U.S. Cl. .................. 228/112.1; 228/245
(58) Field of Classification Search .......... None
See application file for complete search history.

(56) References Cited

U.S. PATENT DOCUMENTS

| | | | |
|---|---|---|---|
| 6,543,671 B2 * | 4/2003 | Hatten et al. ............ | 228/112.1 |
| 6,572,007 B1 * | 6/2003 | Stevenson et al. ........ | 228/112.1 |
| 6,777,107 B2 * | 8/2004 | Satou et al. .................. | 428/615 |
| 7,048,175 B2 | 5/2006 | Runyan | |
| 2002/0011509 A1 * | 1/2002 | Nelson et al. ............ | 228/112.1 |
| 2003/0075584 A1 | 4/2003 | Sarik et al. | |
| 2003/0192941 A1 * | 10/2003 | Ishida et al. ............ | 228/112.1 |
| 2004/0046003 A1 * | 3/2004 | Vyas ....................... | 228/112.1 |
| 2004/0195293 A1 * | 10/2004 | Hamada et al. ............. | 228/103 |
| 2004/0211819 A1 * | 10/2004 | Ezumi et al. ............. | 228/112.1 |
| 2005/0139640 A1 | 6/2005 | Kay | |
| 2006/0060635 A1 * | 3/2006 | Slattery et al. ........... | 228/112.1 |
| 2006/0108394 A1 * | 5/2006 | Okaniwa et al. ............ | 228/101 |
| 2006/0191978 A1 * | 8/2006 | Barnes ..................... | 228/112.1 |
| 2007/0119906 A1 | 5/2007 | Mika | |
| 2007/0138237 A1 * | 6/2007 | Nishikawa et al. ........ | 228/112.1 |
| 2008/0078754 A1 * | 4/2008 | Hosemann et al. .. | 219/137 WM |
| 2009/0068492 A1 * | 3/2009 | Fujii et al. .................. | 428/615 |

FOREIGN PATENT DOCUMENTS

EP 0797043 9/1997

(Continued)

*Primary Examiner*—Kiley Stoner
(74) *Attorney, Agent, or Firm*—Luedeka, Neely & Graham, P.C.

(57) ABSTRACT

Processes for friction stir welding, typically for comparatively thick plate materials using multiple passes and multiple layers of a friction stir welding tool. In some embodiments a first portion of a fabrication preform and a second portion of the fabrication preform are placed adjacent to each other to form a joint, and there may be a groove adjacent the joint. The joint is welded and then, where a groove exists, a filler may be disposed in the groove, and the seams between the filler and the first and second portions of the fabrication preform may be friction stir welded. In some embodiments two portions of a fabrication preform are abutted to form a joint, where the joint may, for example, be a lap joint, a bevel joint or a butt joint. In some embodiments a plurality of passes of a friction stir welding tool may be used, with some passes welding from one side of a fabrication preform and other passes welding from the other side of the fabrication preform.

10 Claims, 7 Drawing Sheets

FOREIGN PATENT DOCUMENTS

| | | |
|---|---|---|
| EP | 1057574 | 12/2000 |
| JP | 11342481 | 12/1999 |
| JP | 2000233284 | 8/2000 |
| JP | 2008-36648 A * | 2/2008 |
| WO | WO 2007/081005 A1 * | 7/2007 |

* cited by examiner

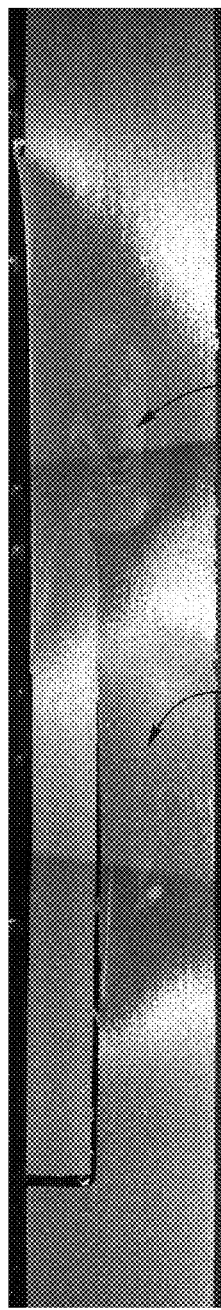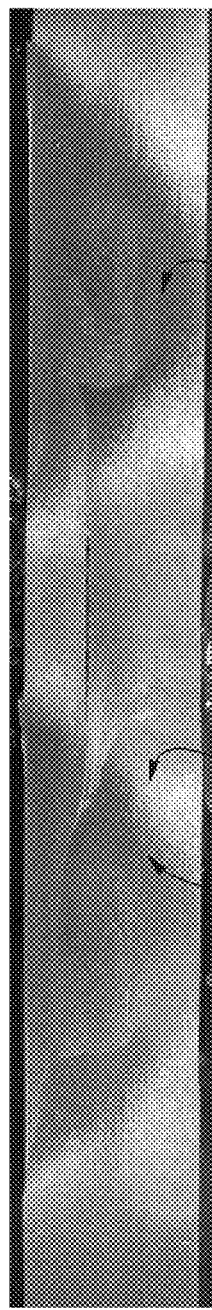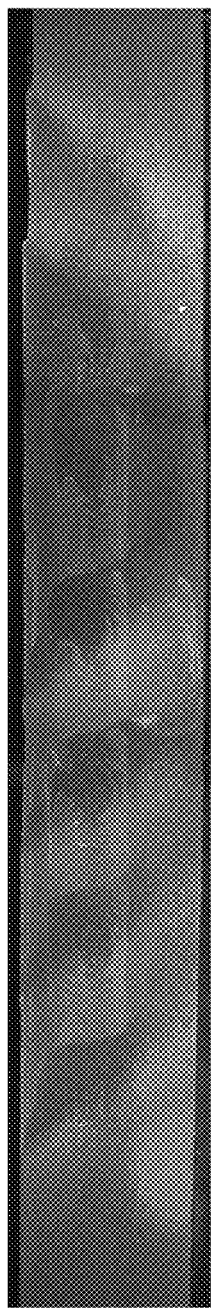

MULTIPLE PASS AND MULTIPLE LAYER FRICTION STIR WELDING AND MATERIAL ENHANCEMENT PROCESSES

GOVERNMENT RIGHTS

This invention was made with government support under Contract No. DE-AC05-00OR22725 awarded by the U.S. Department of Energy. The government has certain rights in the invention.

FIELD

This disclosure relates to the field of friction stir welding and material processing. More particularly, this disclosure relates to methods of joining fabrication preforms or portions of a fabrication preform or workpieces and fillers at their edges using friction stir welding, and methods to form new and/or enhanced materials by means of friction stir material processing.

BACKGROUND

Friction stir welding (FSW) is a welding process in which a cylindrical, shouldered welding tool having a pin protruding from the shouldered surface is rotated and plunged into a joint line between two portions of a fabrication preform. The portions of the fabrication preform are typically of metal, but the process may also be used on various plastics and polymers. Typically the pieces are clamped together to prevent relative motion between the pieces during the welding process. Frictional heat is generated between the pin and the material of the portions of the fabrication preform. This heat causes the adjacent material to soften (generally without reaching its melting point). The tool is then moved relative to the portions of the fabrication preform along a weld line while the shoulder of the tool is pressed against the surface of each portion of the fabrication preform. The softened material is transferred from the leading edge of the pin to the trailing edge of the pin. The shoulder helps form a flat weld that is even with the surface of each portion of the fabrication preform and that, after cooling, bonds the portions of the fabrication preform together.

The power required to spin a friction stir tool increases significantly when the process is applied to thicker and/or harder materials. Consequently, current friction stir welding processes are generally best suited for welding aluminum or other comparatively soft metals with thicknesses of less than approximately one inch (2.5 cm). What are needed therefore are improved friction stir welding processes that may be applied to thicker and/or harder materials.

SUMMARY

The present disclosure provides a method of joining a first portion of a fabrication preform and a second portion of the fabrication preform where the portions of the fabrication preform have abutted edges that form a joint and wherein a groove is disposed adjacent at least a portion of the joint. The method includes a step of friction stir welding at least a portion of the joint. The method further includes a step of disposing a filler in at least a portion of the groove, wherein a first seam is formed between the filler and the first portion of the fabrication preform and a second seam is formed between the filler and the second portion of the fabrication preform. The method proceeds with friction stir welding at least a portion of the first seam and friction stir welding at least a portion of the second seam. Additional friction stir weld steps may be applied with fillers to further join portions of the fabrication preform.

Also provided is a method of forming an enhanced structure from a fabrication preform having a first common surface and a recess below the first common surface. This method has a step of disposing in at least a portion of the recess a filler comprising a composition of material that may be the same or different than at least a portion of the fabrication preform, wherein a first seam and a second seam are formed between the filler and at least a portion of the recess. The method proceeds with friction stir welding at least a portion of the first seam in a first pass of a friction stir welding tool to form a first bond, and friction stir welding at least a portion of the second seam in a second pass of a friction stir welding tool to form a second bond. Additional friction stir weld steps may be applied with fillers to further join portions of the fabrication preform.

Another embodiment provides a method of forming an enhanced material from a fabrication preform having a first common surface and a recess below the first common surface. This method includes a step of disposing in at least a portion of the recess a filler comprising a composition of material that is different than at least a portion of the fabrication preform, wherein a first seam and a second seam are formed between the filler and at least a portion of the recess. A further step is friction stir mixing at least a portion of the first seam in a first pass of a friction stir tool to form a first bond, and a further step is friction stir mixing at least a portion of the second seam in a second pass of a friction stir tool to form a second bond. Further friction stir steps may be applied to produce substantially homogeneous materials or materials with improved compositions and/or property gradients.

Also provided is a method of joining a first portion of a fabrication preform and a second portion of the fabrication preform where the first portion of the fabrication preform has a first planar surface, an opposing second planar surface, and a first edge and the second portion of the fabrication preform has a third planar surface and an opposing fourth planar surface and a second edge. The first edge and the second edge form a seam between the first portion of the fabrication preform and the second portion of the fabrication preform, and the first planar surface and the third planar surface are substantially co-planar and form a first common surface. The second planar surface and the fourth planar surface are substantially co-planar and form a second common surface. The method includes the step of friction stir welding at least a portion of the seam along a first weld path on the first common surface, where the first weld path forms a first weld path plane that is perpendicular to the first common surface. The method also includes the step of friction stir welding at least a portion of the seam on a second weld path on the second common surface, where the second weld path forms a second weld path plane that is perpendicular to the second common surface.

Another embodiment provides a method of joining a first portion of a fabrication preform having a first thickness and a second portion of the fabrication preform having a second thickness. The method includes a step of disposing a transition piece between the first portion of the fabrication preform and the second portion of the fabrication preform. The transition piece has a first edge and a second edge opposed to the first edge, and the transition piece is configured to vary in thickness from approximately the first thickness at the first edge to approximately the second thickness at the second edge. A first joint is formed between the first portion of the fabrication preform and the transition piece and a second joint is disposed between the transition piece and the second portion of the fabrication preform. The method also includes the step of friction stir welding at least portions of the first joint, and the step of friction stir welding at least a portion of the second joint.

BRIEF DESCRIPTION OF THE DRAWINGS

Various advantages are apparent by reference to the detailed description in conjunction with the figures, wherein elements are not to scale so as to more clearly show the details, wherein like reference numbers indicate like elements throughout the several views, and wherein:

FIGS. 10A-10C are photographs of cross-sections of an example of a multi-pass friction stir weld at successive stages of completion.

DETAILED DESCRIPTION

In the following detailed description of the preferred embodiments, reference is made to the accompanying drawings, which form a part hereof, and within which are shown by way of illustration the practice of specific embodiments of methods of joining a first portion of a fabrication preform and a second portion of the fabrication preform using friction stir welding and embodiments of reinforcing a fabrication preform structure using friction stir welding. Also depicted are various embodiments for producing enhanced structures and materials using stir friction processes. It is to be understood that other embodiments may be utilized, and that structural changes may be made and processes may vary in other embodiments.

Figure 1A:
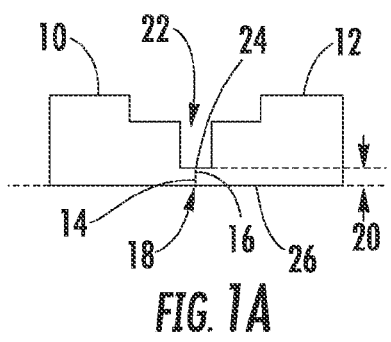
FIGS. 1A-1Q are somewhat schematic cross-sectional illustrations of steps in friction stir welding processes.
Figure 1B:
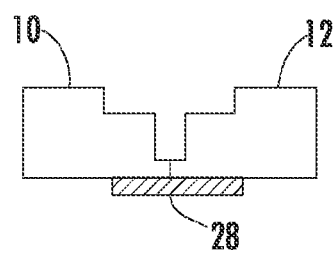
Figure 1C:
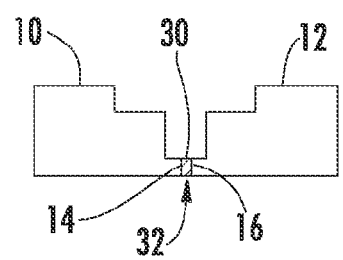
Figure 1D:
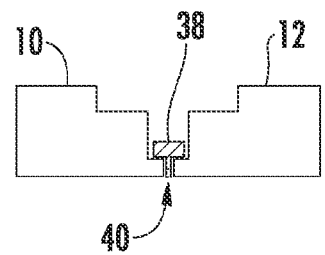
Figure 1E:
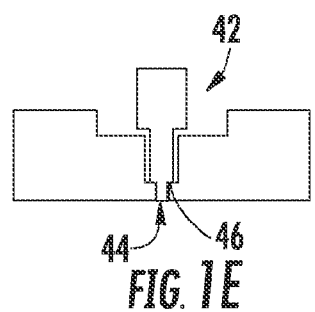
Figure 1F:
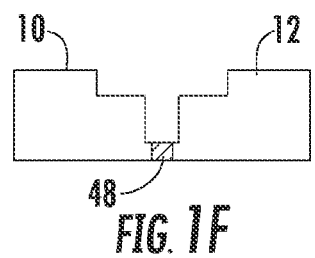
Figure 1G:
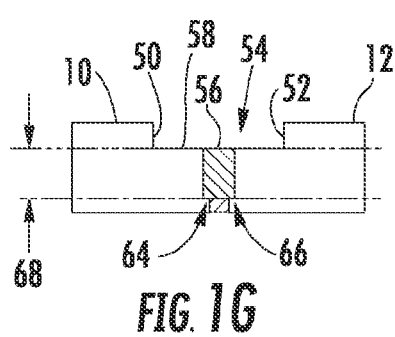
Figure 1H:
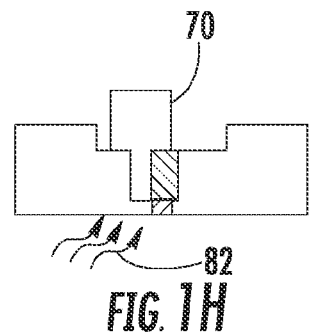
Figure 1I:
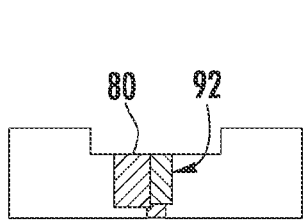
Figure 1J:
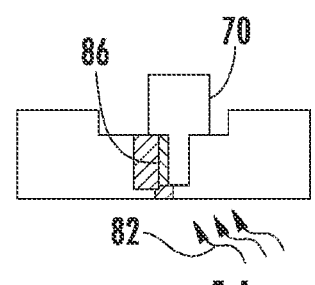
Figure 1K:
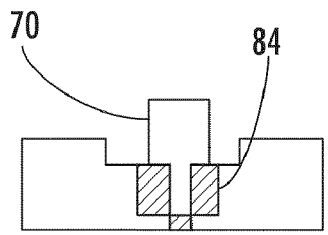
Figure 1L:
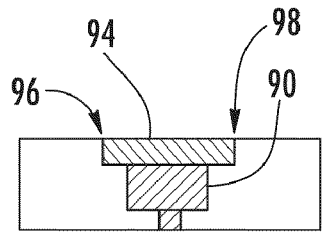
Figure 1M:
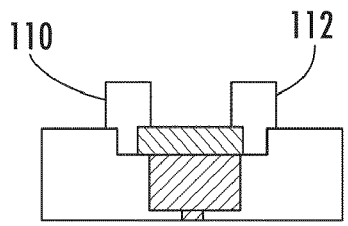
Figure 1N:
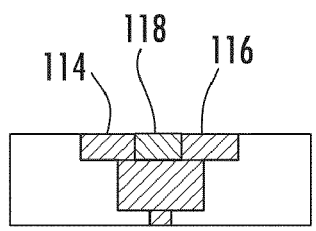
Figure 1O:
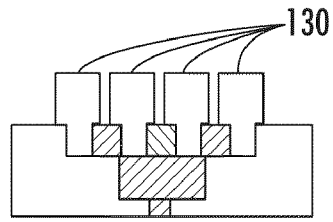
Figure 1P:
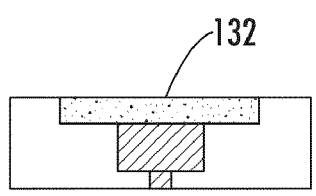
Figure 1Q:
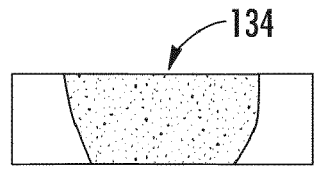

FIGS. 1A-1Q illustrate various steps in a multiple-pass and multiple-layer friction stir welding processes. FIG. 1A depicts a cross-sectional edge view of a first portion 10 of a fabrication preform and a second portion 12 of a fabrication. In some embodiments the first portion 10 of the fabrication preform is a first workpiece and the second portion 12 of the fabrication preform is a second workpiece that is to be joined with the first workpiece. In other embodiments the first portion 10 of the fabrication preform and the second portion 12 of the fabrication preform are portions of the same workpiece that are to be joined together. In some embodiments the first portion 10 of the fabrication preform and the second portion 12 of the fabrication preform are composed of substantially the same composition of material, and in other embodiments the first portion 10 of the fabrication preform and the second portion 12 of the fabrication preform may be composed of different compositions of material. When referring herein to different compositions of material these differences may be chemical differences and/or physical bulk property differences such as density differences. The first portion 10 of the fabrication preform has a first edge 14 and the second portion 12 of the fabrication preform has a second edge 16. The first edge 14 and the second edge 16 abut and form a joint 18 between the first portion 10 of the fabrication preform and the second portion 12 of the fabrication preform. The joint 18 has a first height 20. A first groove 22 is disposed between the first portion 10 of the fabrication preform and the second portion 12 of the fabrication preform, adjacent the joint 18. The base of the first groove 22 forms a first common surface 24 of the first portion 10 of the fabrication preform and the second portion 12 of the fabrication preform. The first portion 10 of the fabrication preform and the second portion 12 of the fabrication preform and a portion of the joint 18 form a second common surface 26 that is opposed to the first common surface 24. As used herein, a "common surface" is a generally flat planar surface formed by two or more generally adjacent elements. It is understood that some discontinuities and irregularities may occur in the contour of a common surface provided that they do not prevent the application of a friction stir welding process along a path on the common surface.

In some embodiments as depicted in FIG. 1B, a back support piece 28 may be used to help maintain the structural integrity of the portions of the fabrication preform (e.g., portions of the fabrication preform 10 and 12) during friction stir welding or material enhancement processes. The back support piece 28 typically does not become a portion of the assembly that is formed after friction stir welding.

FIG. 1C illustrates an alternate embodiment wherein a bridge material 30 is disposed between the first portion 10 of the fabrication preform and the second portion 12 of the fabrication preform. The first portion 10 of the fabrication preform and the second portion 12 of the fabrication preform are considered to have abutting edges (14 and 16) even though the bridge material is disposed between the first edge 14 and the second edge 16. The first edge 14 and the second edge 16 and the bridge material 30 form a joint 32 between the first portion 10 of the fabrication preform and the second portion 12 of the fabrication preform. FIG. 1D depicts an alternate configuration of bridge material 38 that in part defines a joint 40 between the first portion 10 of the fabrication preform and the second portion 12 of the fabrication preform. At least a portion of the bridge material 38 is configured to be disposed above the first common surface 24 (identified in FIG. 1A) and that portion of the bridge helps maintain a flow of bridge material between the first portion 10 of the fabrication preform and the second portion 12 of the fabrication preform during friction stir welding. It should be noted that the joint 32 of FIG. 1C and the joint 40 of FIG. 1D (where a filler is disposed between the edges of portions of a fabrication preform), and the joint 18 of FIG. 1A the joint 18 (where the joint is a seam between the edges of portions of a preform without an intervening filler) are each defined as "joints" herein.

The bridge material 30 or 38 may be useful in cases of fabrication preform dimensional variations, and/or to form a first bond between the first portion 10 of the fabrication preform and the second portion 12 of the fabrication preform that has a different composition and/or physical properties from either or both the first and second portions of the fabrication preform (10 and 12). The bridge material 30 or 38 may be composed of substantially the same composition of material as the first portion 10 of the fabrication preform and/or the second portion 12 of the fabrication preform, or the bridge material 30 or 38 may be composed of a composition of material that is different from the composition of material of the first portion 10 of the fabrication preform and different from the composition of material of the second portion 12 of the fabrication preform. In some embodiments the bridge material 30 or 38 is a composite material. As used herein the term "composite material" refers to a plurality of materials with each material being disposed in a separate physical region of the composite material. In many but not all cases the materials have different compositions of material. Examples of a composite material are a metal/metal composite, a cermet composite, a bundle of wires, a package of layered materials, and other aggregations of materials having the same or different compositions. For example, a bundle of wires or rods made of different materials may be consolidated by thermal/mechanical processes to synthesize a composite material for use as the bridge material 30 or 38.

FIG. 1E shows a starting step of a friction stir welding process to join the first portion 10 of the fabrication preform and the second portion 12 of the fabrication preform as configured in FIG. 1A. A similar starting step may be used to join the first portion 10 of the fabrication preform and the second portion 12 of the fabrication preform as configured in FIG. 1B, 1C, or 1D. FIG. 1E illustrates a friction stir welding tool 42 with a pin 44 that protrudes from a shoulder surface 46 of the tool 42. To start the process of friction stir welding, the pin 44 of the tool 42 is rapidly rotated around the axis of the pin and then typically the pin 44 is plunged into or proximal to the first seam 18 (identified in FIG. 1A). In the case of the configuration of FIG. 1C the shoulder surface 46 of the tool 42 is pressed against the bottom of the first groove 22 (identified in FIG. 1A). In the case of the configuration of FIG. 1D the shoulder surface 46 of the tool 42 is pressed against the top of the filler 38. While the tool 42 continues to rotate, the tool 42 is moved laterally along a weld path that follows the joint 18 (or the joint 32 in the configuration of FIG. 1C or the joint 40 in the configuration of FIG. 1D). This is called a welding pass. The joint 18 (or 32 or 40) and an associated weld path may follow a straight line, a curved line, or a jagged line and may comprise a simple planar surface, a collection of many simple planar surfaces, a non-planar surface, or a collection of many non-planar surfaces. Material from the first portion 10 of the fabrication preform that is adjacent the joint 18 (or 32 or 40) and material from the second portion 12 of the fabrication preform that is adjacent the joint 18 are friction stir welded to form a first bond 48 (as seen in FIG. 1F). The welding pass that forms the first friction stir weld (i.e., the first bond 48 in this embodiment) of a multi-pass friction stir weld is referred to herein as the "root pass."

As labeled in FIG. 1G, a first fillet 50 cut into the first portion 10 of the fabrication preform and a second fillet 52 cut into the second portion 12 of the fabrication preform form a second groove 54 between the first portion 10 of the fabrication preform and the second portion 12 of the fabrication preform. The second groove 54 is adjacent the first groove 22 (identified in FIG. 1A). Subsequent to the formation of the first bond 48, a first filler 56 is disposed in at least a portion of the first groove 22 between the first portion 10 of the fabrication preform and the second portion 12 of the fabrication preform. Typically the first filler 56 is a solid bar that is inserted into the first groove 22 (identified in FIG. 1A) after the first bond 48 is formed and before further friction stir welding is performed. In some embodiments the first filler 56 may be a powder or a paste material. The first filler 56 may be composed of substantially the same composition of material as the first portion 10 of the fabrication preform and/or the second portion 12 of the fabrication preform, or the first filler 56 may be composed of a composition of material that is different from the composition of material of the first portion 10 of the fabrication preform and different from the composition of material of the second portion 12 of the fabrication preform. In some embodiments the first filler 56 is a composite material, such as metal/metal composite, a cermet composite, or a bundle of wires, layered materials or other forms of mixture of the same or different materials. For example, a bundle of wires or rods made of different materials may be consolidated by thermal/mechanical processes to synthesize the filler 56.

In the sequence of operations depicted in FIGS. 1A-1Q the second groove 54 (identified in FIG. 1G) was cut into the first portion 10 of the fabrication preform and the second portion 12 of the fabrication preform before any friction stir welding was performed. However, in alternate embodiments the second groove 54 may, for example, be machined out after the first bond 48 is formed and either before or after the first filler 56 is disposed in at least a portion of the first groove 22.

Continuing further with FIG. 1G, the base of the first fillet 50, the top of the first filler 56 and the base of the second fillet 52 form a third common surface 58. A first seam 64 is formed between the first filler 56 and the first portion 10 of the fabrication preform and a second seam 66 is formed between the first filler 56 and the second portion 12 of the fabrication preform. The first seam 64 and the second seam 66 each have a second height 68, and the second height 68 is different from the first height 20 of the joint 18. Configuring different seam heights may be useful in balancing energy requirements between friction stir welds in a multi-pass friction stir welding process. It is understood that a "seam" as described herein (such as the seam 64 or seam 66) and an associated weld path may follow a straight line, a curved line, or a jagged line and may comprise a simple planar surface, a collection of many simple planar surfaces, a non-planar surface, or a collection of many non-planar surfaces.

Then as depicted in FIG. 1H, a second friction stir tool 70 is used along the first seam 64 (identified in FIG. 1G) to form a second bond 80, as seen in FIG. 1I. As further depicted in FIG. 1H, a source of pre-heating 82 may be applied to the material adjacent the second seam 64 (as identified in FIG. 1G). The preheating 82 may, for example, be provided by a laser, an electric arc, an induction heating source, an infrared source, an ultrasonic source, or a microwave source. The preheating 82 typically softens and may even partially melt the materials being friction stir welded. This typically reduces the energy load required to drive the second friction stir tool 70.

In FIG. 1J the second friction stir tool 70 is used along the second seam 66 (identified in FIG. 1G) to form a third bond 84, as seen in FIG. 1K. As further depicted in FIG. 1J, a source of pre-heating 82 may be applied to the material adjacent the second seam 66 (as identified in FIG. 1G). In the embodiment of FIG. 1J a portion 86 of the first filler 56 remains substantially unaltered by the friction stir welding process. In alternate embodiments such as depicted in FIG. 1K a further pass (or passes) of the friction stir tool 70 may be used to mix the entirety of the first filler 56 with the second bond 80 and the third bond 84 to form a mixed bond 90 as depicted in FIG. 1L. In alternate embodiments the entirety of the first filler 56 may be mixed with the second bond 80 and the third bond 84 and with at least portions of the material of the first portion 10 of the fabrication preform, the second portion 12 of the fabrication preform, and the root pass (the first bond 48) to form a mixed bond. For maximum strength of a weld is desirable to mix the materials so that the weld is formed without any voids or discontinuities.

As further seen in FIG. 1L, after completion of the friction stir welding processes of FIGS. 1J and 1K, a second filler 94 is disposed in at least a portion of the second groove 54 (identified in FIG. 1G) between the first portion 10 of the fabrication preform and the second portion 12 of the fabrication preform. A third seam 96 is formed between the second filler 94 and the first portion 10 of the fabrication preform, and a fourth seam 98 is formed between the second filler 94 and the second portion 12 of the fabrication preform.

Then as seen in FIG. 1M, two friction stir tools 110 and 112 are used simultaneously along the third seam 96 and the fourth seam 98 respectively. This forms a fourth bond 114 and a fifth bond 116 as seen in FIG. 1N. In the embodiments of FIGS. 1A-1N, a portion 118 of the second filler 94 remains substantially unaltered by the friction stir welding processes, as depicted in FIG. 1N. As illustrated in FIG. 1O, in some embodiments further friction stir welding passes represented by stir tools 130, may be made through the portion 118 to mix substantially all of the second filler 94 with either or both of the fourth bond 114 and the fifth bond 116. The result may be a partially homogenous surface region 132 depicted in FIG. 1P. Furthermore, by using a friction stir welding tool (such as friction stir welding tool 70) that has a longer pin than the pin of friction stir welding tool 110 or 112, a portion of the second filler 94 may be mixed with the second bond 80, and/or with the portion 92 of the first filler 56, and/or with the third bond 90. Furthermore, as illustrated in FIG. 1Q, by using combinations of successive passes a substantially homogenously region 134 may be created to bond the portions of the fabrication preform together. The completed welds in FIGS. 1N, 1P, and 1Q are examples of "multiple pass" and "multiple layer" friction stir welds.

It is understood that some or all of the steps described in FIG. 1A-1Q may be repeated multiple times to produce a welded structure of virtually unlimited thickness.

FIGS. 2A-2M depict friction stir processes and results performed on a fabrication "preform" in order to form an enhanced structure (article of manufacture) and/or to produce enhanced materials (compositions of material). The enhanced structure or enhanced material may have enhanced chemical, physical, mechanical or electrical properties, or combinations thereof. For example, an enhanced structure or enhanced material may have improved catalytic properties or improved corrosion resistance. An enhanced structure or enhanced material may have (in at least portions of the enhanced structure) modified conductive, semi-conductive, or insulative electrical or thermal properties or different magnetic properties. An enhanced structure or enhanced material may have improved or intentionally diminished strength, or may have a modified coefficient of thermal expansion, or may have a modified melting temperature.

Figure 2A:
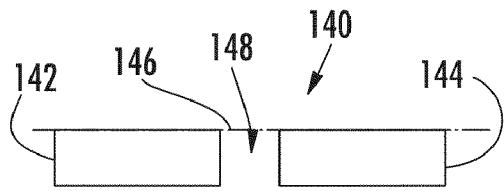
FIGS. 2A-2M are somewhat schematic cross-sectional illustrations of components and steps used in certain friction stir processes.
Figure 2B:
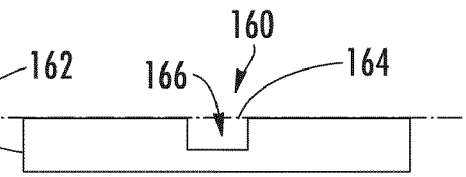

FIG. 2A illustrates a fabrication preform 140 that includes a first piece 142 and a second piece 144. The fabrication preform 140 has a first common surface 146. A gap 148 between the first piece 142 and the second piece 144 forms a recess below the first common surface 146 of the fabrication preform 140. FIG. 2B illustrates a fabrication preform 160 formed from a single piece 162. The fabrication preform 160 has a first common surface 164. A channel 166 forms a recess below the first common surface 164.

Figure 2C:
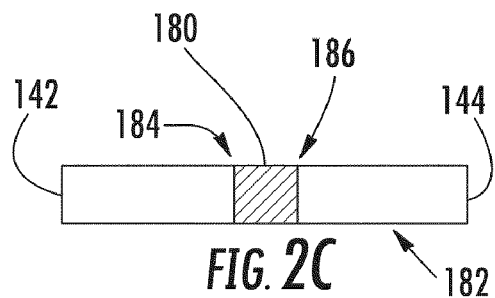
Figure 2D:
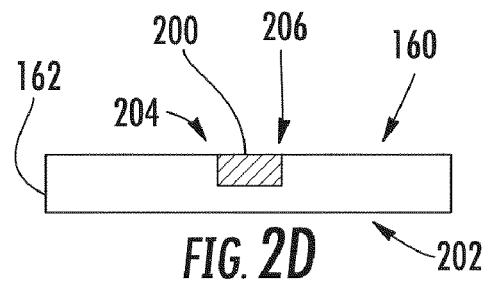

In FIG. 2C a filler 180 is disposed in at least a portion of the recess (the gap 148 identified in FIG. 2A) in the fabrication preform 140 to form a filled preform 182. The filler 180 typically includes a composition of material that is different from the composition of material of the first piece 142 of the fabrication preform 140 and/or that this different from the composition of material of the second piece 144 of the fabrication preform 140. In some embodiments, the filler material 180 is a composite material, such as metal/metal composite, a cermet composite, or a bundle of wires, layered materials or other forms of mixture of the same or different materials. The composite filler 180 may be consolidated or synthesized by the thermal/mechanical deformation and mixing action of the friction stir process to form an enhanced structure and/or to produce enhanced or new materials. In other embodiments, the filler 180 has a composition substantially same as either the first piece 142 or the second piece of 144. A first seam 184 is formed between the filler 180 and the recess (the gap 148) in the fabrication preform 140 and a second seam 186 is formed between the filler 180 and the recess (the gap 148) in the fabrication preform 140. In FIG. 2D a filler 200 is disposed in at least a portion of the recess (the channel 166) in the fabrication preform 160 to form a filled preform 202. A first seam 204 is formed between the filler 200 and the recess (channel 166) in the fabrication preform 160 and a second seam 206 is formed between the filler 200 and the recess (channel 166) in the fabrication preform 160.

FIGS. 2E-2L depict friction stir processes and results performed on the filled preform 182 depicted in FIG. 2C. Similar friction stir processes and similar results may be achieved using the filled preform 202 depicted in FIG. 2D, or other similar filled preforms.

Figure 2E:
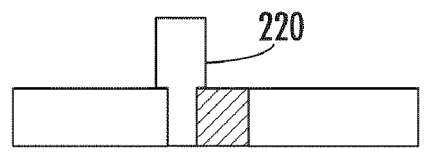
Figure 2F:
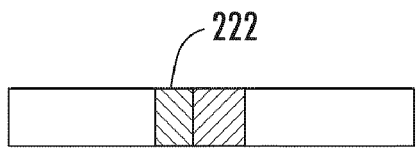
Figure 2G:
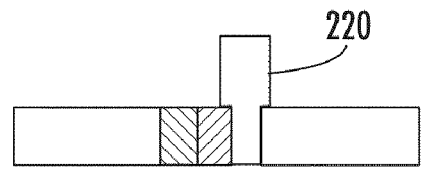
Figure 2H:
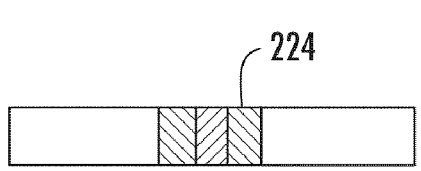

FIG. 2E depicts a friction stir tool 220 being used along the first seam 184 (identified in FIG. 2C) of filled preform 182 to form a first bond 222, as seen in FIG. 2F. Then in FIG. 2G the friction stir tool 220 is used along the second seam 186 (identified in FIG. 2C) of filled preform 182 to form a second bond 224, as seen in FIG. 2H.

Figure 2I:
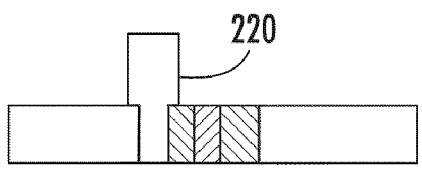
Figure 2J:
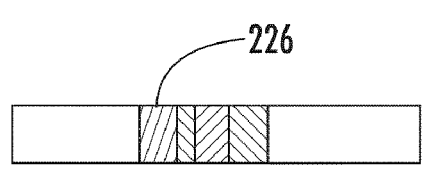

In FIG. 2I, a further pass of the friction stir tool 220 is made between the material of the first piece 142 (identified in FIG. 2A) and the first bond 222 (identified in FIG. 2F). This further pass is referred to as stir mixing and it blends the materials of the first bond 222 and the first piece 142 and forms a first blended bond 226 as depicted in FIG. 2J. Such blending may be desirable to form a graded material having more gradual changes in material composition. Additional mixing may be achieved with additional passes between the first blended bond 226 and the first piece 142 to vary the gradient of the material.

Figure 2K:
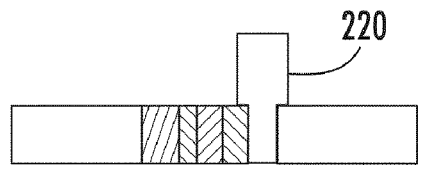
Figure 2L:
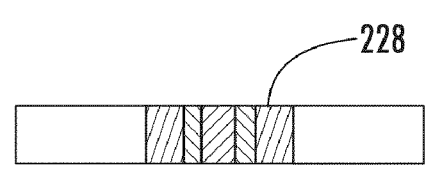
Figure 2M:
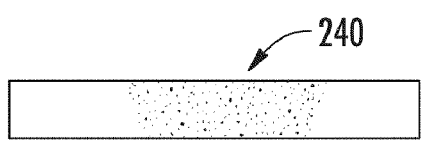

In FIG. 2K, a further stir mixing pass of the friction stir tool 220 is made between the material of the second piece 144 (identified in FIG. 2A) and the second bond 224 (identified in FIG. 2F). This further stir mixing pass blends the materials of the second bond 224 and the second piece 144 and forms a second blended bond 228 as depicted in FIG. 2L. The result of these processes is an enhanced structure 230 as depicted in FIG. 2L. Additional passes with the friction stir tool 220 may be made through various portions of the enhanced structure 230 in order to further bond or blend the composition of materials.

In some cases, it may be desirable to process the remaining material with one or more passes between 226 and 228 to form new materials (e.g., composite materials) that combine materials from the first piece 142 and the second piece 144 and the filler 180. This may produce a substantially uniform block of material such as substantially homogenous region 240 of FIG. 2M. The properties of substantially homogenous region 240 are typically different from the individual properties of the portions of the fabrication preform and the fillers that were used to produce the substantially homogenous region 240. The substantially homogenous region 240 may be sectioned from the finished assembly as a new composition of material and used to fabricate articles of manufacture. In summary, the substantially homogenous region 240 may be produced by the friction stir bonding and/or blending action on a compound of individual materials, to provide a mechanical synthesis of materials. Such processes may be useful to produce compositions of material that are difficult to combine by other means, such as combinations of copper and steel or copper and aluminum.

It is understood that the methods described in FIG. 1A-1Q may be applied in combination with the methods described in FIG. 2A-2M to produce an enhanced structure and/or to produce enhanced materials of unlimited thickness.

Figure 3A:
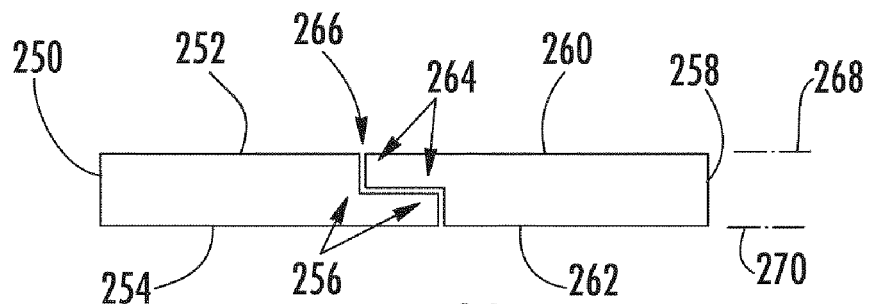
FIGS. 3A-3C are somewhat schematic cross-sectional illustrations of seams between edges of two portions of a fabrication preform that may be joined using friction stir welding.

FIG. 3A depicts a first portion 250 of a preform that has a first planar surface 252, a second planar surface 254 and a first edge 256. FIG. 3A further depicts a second portion 258 of the fabrication preform having a third planar surface 260 and a fourth planar surface 262 and a second edge 264. In some embodiments the first portion 250 of the fabrication preform is a first workpiece and the second portion 258 of the fabrication preform is a second workpiece that is to be joined with the first workpiece. In other embodiments the first portion 250 of the fabrication preform and the second portion 258 of the fabrication preform are portions of the same workpiece that are to be joined together. The first edge 256 and the second edge 264 form a joint 266 (making a lap joint) between the first portion 250 of the fabrication preform and the second portion 258 of the fabrication preform. In the embodiment of FIG. 3A the joint 266 is a seam between the first portion 250 of the preform and the second portion 258 of the preform. In alternate embodiments a joint between the first portion of a preform and the second portion of a preform may include a filler. The first planar surface 252 and the third planar surface 260 are substantially co-planar and form a first common surface 268. The second planar surface 254 and the fourth planar surface 262 are substantially co-planar and form a second common surface 270 that is opposed to the first common surface 268.

Figure 3B:
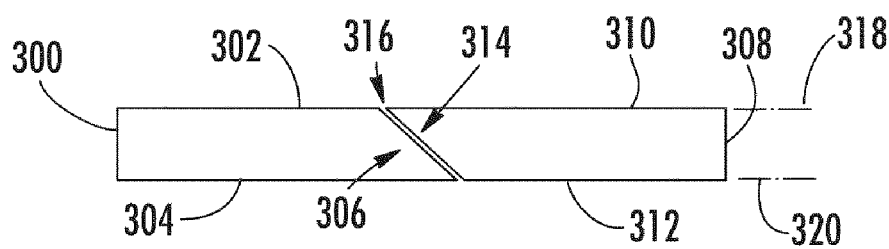

FIG. 3B depicts a first portion 300 of a fabrication preform that has a first planar surface 302, a second planar surface 304 and a first edge 306. FIG. 3B further depicts a second portion 308 of the fabrication preform having a third planar surface 310 and a fourth planar surface 312 and a second edge 314. In some embodiments the first portion 300 of the fabrication preform is a first workpiece and the second portion 308 of the fabrication preform is a second workpiece that is to be joined with the first workpiece. In other embodiments the first portion 300 of the fabrication preform and the second portion 308 of the fabrication preform are portions of the same workpiece that are to be joined together. The first edge 306 and the second edge 314 form a joint 316 (making a bevel joint) between the first portion 300 of the fabrication preform and the second portion 308 of the fabrication preform. The first planar surface 302 and the third planar surface 310 are substantially co-planar and form a first common surface 318. The second planar surface 304 and the fourth planar surface 312 are substantially co-planar and form a second common surface 320 that is opposed to the first common surface 318.

Figure 3C:
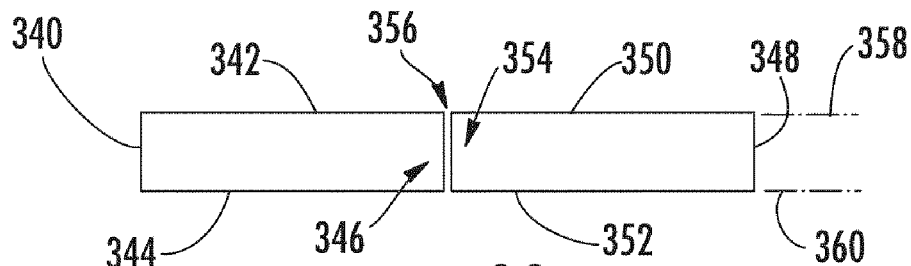

FIG. 3C depicts a first portion 340 of a fabrication preform that has a first planar surface 342, a second planar surface 344 and a first edge 346. FIG. 3C further depicts a second portion 348 of the fabrication preform having a third planar surface 350 and a fourth planar surface 352 and a second edge 354. In some embodiments the first portion 340 of the fabrication preform is a first workpiece and the second portion 348 of the fabrication preform is a second workpiece that is to be joined with the first workpiece. In other embodiments the first portion 340 of the fabrication preform and the second portion 348 of the fabrication preform are portions of the same workpiece that are to be joined together. The first edge 346 and the second edge 354 form a joint 356 (making a butt joint) between the first portion 340 of the fabrication preform and the second portion 348 of the fabrication preform. The first planar surface 342 and the third planar surface 350 are substantially co-planar and form a first common surface 358. The second planar surface 344 and the fourth planar surface 352 are substantially co-planar and form a second common surface 360 that is opposed to the first common surface 358.

In addition to the embodiments depicted in FIGS. 3A-3B other configurations of joints may be used such as those formed by tongue-in-groove joints or interlocking joints, and as previously noted, fillers may be employed.

Figure 4:
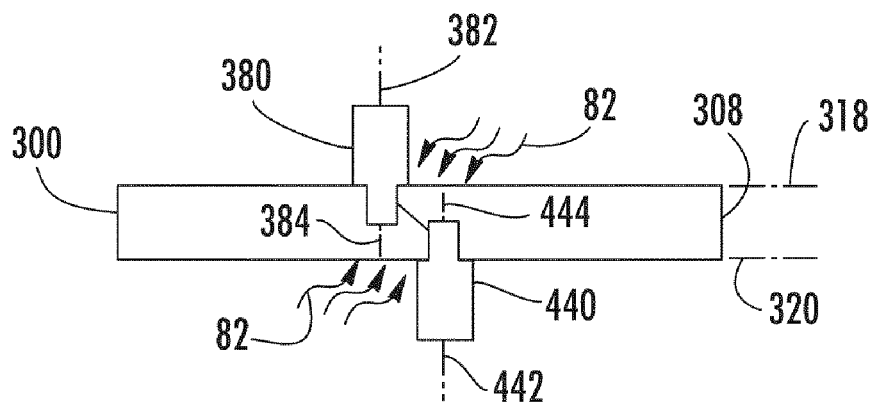
FIG. 4 is a somewhat schematic cross-sectional view of two friction stir welding tools performing a friction stir welding operation on the portions of the fabrication preform of FIG. 3B.

FIG. 4 depicts a first friction stir tool 380 being used along a portion of the joint 316 (identified in FIG. 3B) between the first portion 300 of the fabrication preform and the second portion 308 of the fabrication preform. The first friction stir tool 380 is welding a portion of the joint 316 along a first weld path 382 that is on the first common surface 318 at or at least proximal to where the joint 316 intersects the first common surface 318. The first weld path 382 forms a first weld path plane 384 that is perpendicular to the first common surface 318.

Figure 5A:
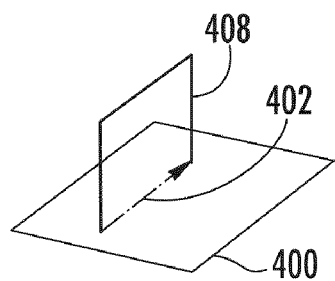
FIGS. 5A-5C depict various features of weld paths and weld planes used in friction stir welding processes.
Figure 5B:
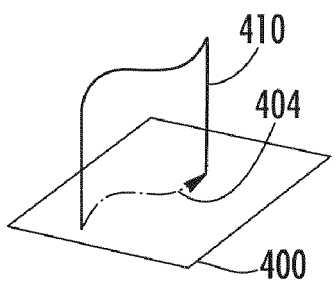
Figure 5C:
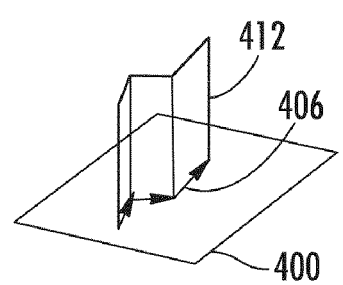

FIGS. 5A-5C illustrate various embodiments of weld paths and weld planes. Each FIG. 5A-5C depicts a common surface 400. FIG. 5A depicts a straight line weld path 402 that is on the common surface 400. FIG. 5B depicts a curved line weld path 404 that is on the common surface 400. FIG. 5C depicts a jagged weld path 406 that is on the common surface 400. FIG. 5A depicts a flat weld plane 408 that is perpendicular to the common surface 400. FIG. 5B depicts a curvilinear weld plane 410 that is perpendicular to the common surface 400. FIG. 5C depicts a jagged weld plane 712 that is perpendicular to the common surface 400. Thus it seen from FIGS. 5A-5C, weld paths may, for example, be straight lines, curved lines or jagged lines, and weld planes may be flat planes, curvilinear planes, or jagged planes. It should also be noted that in FIGS. 5A-5C the common surface 400 is a flat surface. In other embodiments the common surface may be a curved surface or a jagged surface. When the common surface is a curved surface or a jagged surface the weld plane is typically still perpendicular to the common surface at each locus of the welding tool along the weld path.

Returning to FIG. 4, a second friction stir welding tool 440 is used along a portion of the joint 316. The second friction stir welding tool 440 is welding a portion of the joint 316 along a second weld path 442 that is on the second common surface 320 at or at least proximal to where the joint 316 intersects the second common surface 320. The second weld path 442 forms a second weld path plane 444 that is perpendicular to the second common surface 320. In the embodiment of FIG. 4 the first weld path plane and the second weld path plane are not co-planar. In the embodiment of FIG. 4 the first friction stir welding tool 380 and the second friction stir welding tool 440 are welding during substantially the same time interval. In some embodiments the first friction stir welding tool 380 and the second friction stir welding tool 440 may weld during different time intervals. In some embodiments the first friction stir welding tool 380 may be used along the first weld path 382 and then subsequently the same first friction welding tool 380 may be used to friction stir weld along the second weld path 442. As further depicted in FIG. 4, a source of pre-heating 82 is applied to the material adjacent the joint 316 (as identified in FIG. 1G).

Figure 6A:
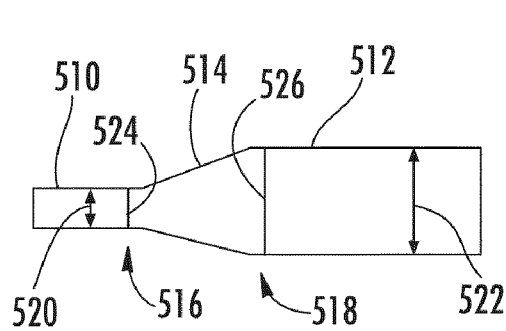
FIGS. 6A-6C illustrate a friction stir welding process for joining materials of different thicknesses.
Figure 6B:
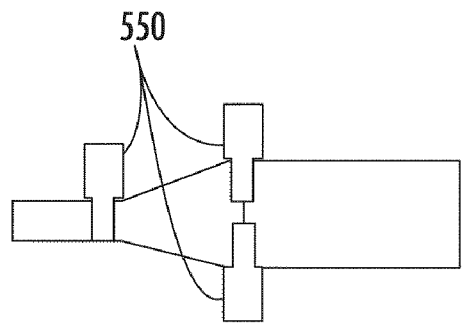

FIG. 6A depicts cross sections of a first portion 510 of a fabrication preform and a second portion 512 of the fabrication preform with a transition piece 514 disposed between the first portion 510 of the fabrication preform and the second portion 512 of the fabrication preform. In some embodiments the first portion 510 of the fabrication preform is a first workpiece and the second portion 512 of the fabrication preform is a second workpiece that is to be joined with the first workpiece. In other embodiments the first portion 510 of the fabrication preform and the second portion 512 of the fabrication preform are portions of the same workpiece that are to be joined together. The first portion 510 of the fabrication preform and the second portion 512 of the fabrication preform may be fabricated from the same material or from different materials. The transition piece 516 may be fabricated from the same material as the first portion 510 of the fabrication preform or the second portion 512 of the fabrication preform or from a different material than either the first portion 510 of the fabrication preform or the second portion 512 of the fabrication preform. There is a first joint 516 between the first portion 510 of the fabrication preform and the transition piece 514 and a second joint 518 between the transition piece 514 and the second portion 512 of the fabrication preform. The first portion 510 of the fabrication preform has a first thickness 520 and the second portion 512 of the fabrication preform has a second thickness 522 that is different from the first thickness 520. The transition piece 514 has a first edge 524 and a second edge 526 opposed to the first edge 524. The transition piece 514 is configured to vary in thickness from approximately the first thickness 520 at the first edge 524 of the transition piece 514 to approximately the second thickness 522 at the second edge 526 of the transition piece 514. As shown in FIG. 6B three friction stir welding tools 550 may be used to weld at least portions of the first joint 516 and the second joint 518.

Figure 7A:
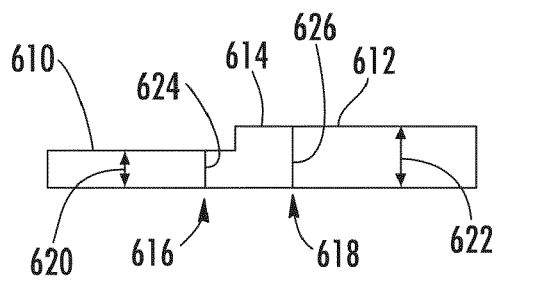
FIGS. 7A-7C illustrate a friction stir welding process for joining materials of different thicknesses.

FIG. 7A depicts cross sections of a first portion 610 of a fabrication preform and a second portion 612 of the fabrication preform with a transition piece 614 disposed between the first portion 610 of the fabrication preform and the second portion 612 of the fabrication preform. In some embodiments the first portion 610 of the fabrication preform is a first workpiece and the second portion 612 of the fabrication preform is a second workpiece that is to be joined with the first workpiece. In other embodiments the first portion 610 of the fabrication preform and the second portion 612 of the fabrication preform are portions of the same workpiece that are to be joined together. The first portion 610 of the fabrication preform and the second portion 612 of the fabrication preform may be fabricated from the same material or from different materials. The transition piece 614 may be fabricated from the same material as the first portion 610 of the fabrication preform or the second portion 612 of the fabrication preform or from a different material than either the first portion 610 of the fabrication preform or the second portion 612 of the fabrication preform.

Figure 7B:
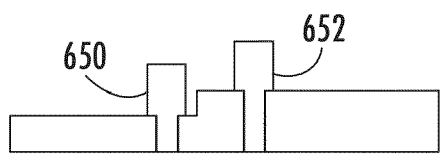

There is a first joint 616 between the first portion 610 of the fabrication preform and the transition piece 614 and a second joint 618 between the transition piece 614 and the second portion 612 of the fabrication preform. The first portion 610 of the fabrication preform has a first thickness 620 and the second portion 612 of the fabrication preform has a second thickness 622 that is different from the first thickness 620. The transition piece 614 has a first edge 624 and a second edge 626 opposed to the first edge 624. The transition piece 614 is configured to vary in thickness from approximately the first thickness 620 at the first edge 624 of the transition piece 614 to approximately the second thickness 622 at the second edge 626 of the transition piece 614. As shown in FIG. 7B a first friction stir welding tool 650 may be used to weld at least a portion of the first joint 616 and a second friction stir welding tool 652 may be used to weld at least a portion of the second joint 618.

Figure 6C:
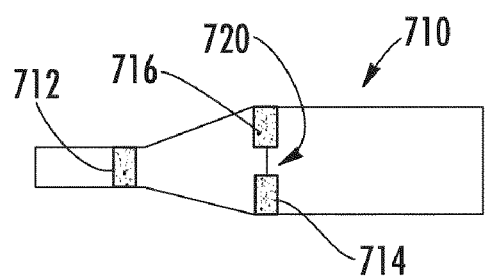
Figure 7C:
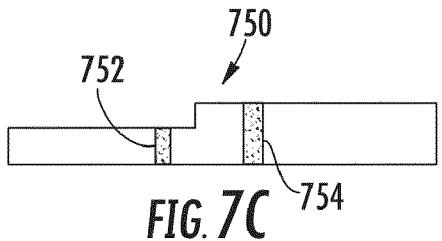

FIG. 6C illustrates the cross-section of a completed assembly 710 made by the process illustrated in FIG. 6B. The completed assembly 710 includes friction stir welds 712, 714 and 716. In the embodiment of FIG. 6C a portion 720 of the second joint 518 between the transition piece 514 and the second portion 512 of the fabrication preform (identified in FIG. 6A) is not welded. In other embodiments the portion 720 may be welded if, for example, friction stir weld tools are used that have a longer pin than the pin depicted for friction stir weld tools 550 in FIG. 6B. FIG. 7C illustrates the cross-section of a completed assembly 750 made by the process illustrated in FIG. 7B. The completed assembly 750 includes friction stir welds 752 and 754. The friction stir welds 712, 714, 716, 752 and 754 may be stir mixed with materials from the adjoining portions of the fabrication preform and transition pieces to form mixed bonds that may provide a more gradual gradient of material property changes across the completed assemblies.

It is understood that the methods described in FIG. 1A-1Q may be applied in combination with the methods described in FIG. 6A-7C to produce welds of unlimited thickness.

It should be noted that in most embodiments no flux is used with friction stir welding processes. Generally a protective atmosphere is not used, although a protective atmosphere such as argon or nitrogen may be used to prevent oxidation of the welded materials. Generally the temperatures of the pieces, portions of a fabrication preform, transition pieces, and fillers individually or collectively are maintained at a temperature that is less than their respective melting temperature.

EXAMPLE

Figure 8:
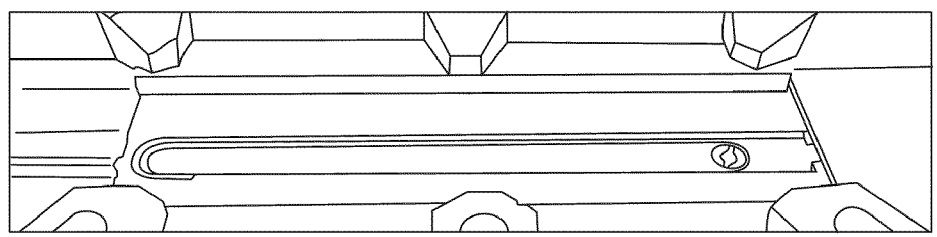
FIG. 8 illustrates an example of a friction stir welding root pass.
Figure 9:
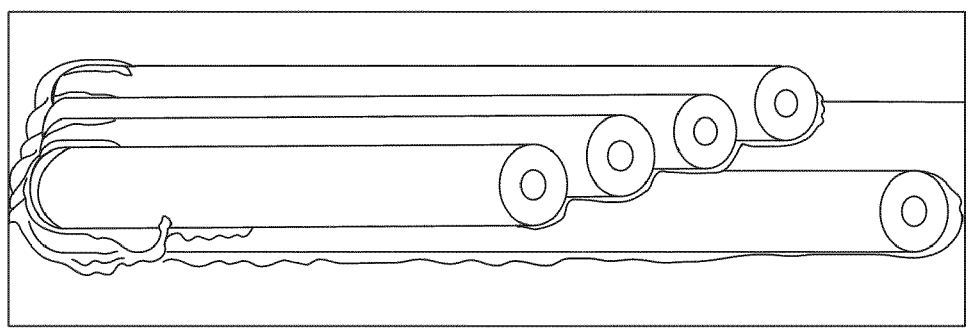
FIG. 9 illustrates an example of a completed multi-pass demonstration friction stir weld.

A proof-of-concept test was conducted to demonstrate the feasibility of certain processes described herein using two aluminum alloy portions of a fabrication preform configured like those depicted in FIG. 1A. FIG. 8 illustrates the portions of the fabrication preform after being joined by a first (root) friction stir welding pass. FIG. 9 illustrates the portions of the fabrication preform after four further friction stir welding passes. FIG. 10A is a cross-sectional photo of the two portions of the fabrication preform showing the root pass 760 and a cover pass 762. As used herein, the term "cover pass" refers to a welding pass that is made at least in part over a root pass or over a previous cover pass. FIG. 10B shows a subsequent cover pass 764. FIG. 10C shows the cross section of the completed joint.

In summary, embodiments disclosed herein provide processes for joining a first portion of a fabrication preform and a second portion of the fabrication preform where the portions of a fabrication preform have abutted edges that form a first seam and wherein a groove is disposed adjacent at least a portion of the first seam. Also disclosed are embodiments of methods for forming an enhanced structure/material from a fabrication preform that has a first common surface and a recess below the first common surface. Further disclosed are methods of joining a first portion of a fabrication preform and a second portion of the fabrication preform where the first portion of the fabrication preform has a first planar surface, an opposing second planar surface, and a first edge and the second portion of the fabrication preform has a third planar surface and an opposing fourth planar surface and a second edge, and the first edge and the second edge form a seam between the first portion of the fabrication preform and the second portion of the fabrication preform and the first planar surface and the third planar surface are substantially co-planar and form a first common surface and the second planar surface and the fourth planar surface are substantially co-planar and form a second common surface. Also disclosed herein are articles of manufacture made by these processes.

The foregoing descriptions of embodiments have been presented for purposes of illustration and exposition. They are not intended to be exhaustive or to limit the embodiments to the precise forms disclosed. Obvious modifications or variations are possible in light of the above teachings. The embodiments are chosen and described in an effort to provide the best illustrations of principles and practical applications, and to thereby enable one of ordinary skill in the art to utilize the various embodiments as described and with various modifications as are suited to the particular use contemplated. All such modifications and variations are within the scope of the appended claims when interpreted in accordance with the breadth to which they are fairly, legally, and equitably entitled.

What is claimed is:

1. A method of joining a first portion of a fabrication preform and a second portion of the fabrication preform, the first and second portions of the fabrication preform having abutted edges that form a joint and wherein a first groove is disposed adjacent at least a portion of the joint, the first groove having a first base forming a first common surface of the first portion of the fabrication preform and the second portion of the fabrication preform, the method comprising:
    friction stir welding substantially the entire joint in a first pass;
    disposing a first filler in at least a portion of the first groove, wherein a first seam is formed between the first filler and the first portion of the fabrication preform and a second seam is formed between the first filler and the second portion of the fabrication preform;
    friction stir welding at least a portion of the first seam in a second pass; and
    friction stir welding at least a portion of the second seam in a third pass; wherein
    the first common surface is substantially entirely friction stir welded.

2. The method of claim 1 wherein the filler comprises a bundle of wires.

3. The method of claim 1 wherein the first and the second portions of the fabrication preform consist of a metal and the first filler comprises a composite material.

4. The method of claim 1 wherein the first portion of the fabrication preform further comprises a first fillet and the second portion of the fabrication preform comprises a second fillet, the first and second fillet forming a second groove between the first portion of the fabrication preform and the second portion of the fabrication preform and adjacent the first groove, the second groove having a second base forming a third common surface of the first portion of the fabrication preform and the second portion of the fabrication preform, the method further comprising:
    disposing a second filler in at least a portion of the second groove forming a third seam between the second filler and the first portion of the fabrication preform and a fourth seam between the second filler and the second portion of the fabrication preform;
    friction stir welding at least a portion of the third seam; and
    friction stir welding at least a portion of the fourth seam; wherein
    the third common surface is substantially entirely friction stir welded.

5. The method of claim 1 further comprising the step of supporting the joint with a back support piece during the step of friction stir welding substantially the entire joint in a first pass, wherein the back support piece does not become a portion of an assembly that is formed after the friction stir welding steps.

6. The method of claim 1 wherein the joint comprises a bridge material and at least a portion of the bridge material is disposed above the first common surface.

7. The method of claim 1 wherein the first portion of the fabrication preform further comprises a first fillet and the second portion of the fabrication preform comprises a second fillet, the first and second fillet forming a second groove between the first portion of the fabrication preform and the second portion of the fabrication preform and adjacent the first groove, the second groove having a second base forming a third common surface of the first portion of the fabrication preform and the second portion of the fabrication preform, the method further comprising:
    disposing a second filler in at least a portion of the second groove forming a third seam between the second filler and the first portion of the fabrication preform and a fourth seam between the second filler and the second portion of the fabrication preform;
    friction stir welding substantially the entire third seam; and
    friction stir welding substantially the entire fourth seam, wherein
    the joint, the first seam, the first filler, the second seam, the first fillet, and the second filler are substantially homogenously friction stir welded.

8. The method of claim 1 wherein the joint comprises two parallel edges that form a bevel joint.

9. The method of claim 1 comprising at least a fourth pass to substantially entirely friction stir weld the first common surface.

10. The method of claim 4 further comprising friction stir welding a portion of the third common surface between the third seam and the fourth seam with at least one further pass to substantially entirely friction stir weld the third common surface.

* * * * *